(12) United States Patent
Son et al.

(10) Patent No.: US 7,437,888 B2
(45) Date of Patent: Oct. 21, 2008

(54) REFRIGERATOR

(75) Inventors: Seok Jun Son, Gwangju (KR); Song Yik Lee, Gwangju (KR); Seong Ki Jeong, Yongin-si (KR); Sang Ky Je, Gwangju (KR); Dae Seong Kim, Gwangju (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 339 days.

(21) Appl. No.: 11/357,968

(22) Filed: Feb. 22, 2006

(65) Prior Publication Data

US 2007/0084238 A1  Apr. 19, 2007

(30) Foreign Application Priority Data

Oct. 17, 2005  (KR) .................. 10-2005-0097761

(51) Int. Cl.
F25B 41/06  (2006.01)
(52) U.S. Cl. .......................... 62/527; 62/528
(58) Field of Classification Search .......... 62/527, 62/441, 442, 525, 528, 199, 324.6; 137/625.47, 137/554, 625, 625.11, 625.15, 625.16; 251/129.11, 251/129.12, 129.13, 129.19
See application file for complete search history.

(56) References Cited

U.S. PATENT DOCUMENTS

| | | | | |
|---|---|---|---|---|
| 5,529,026 A | * | 6/1996 | Kurr et al. | 123/41.1 |
| 6,145,538 A | * | 11/2000 | Park | 137/554 |
| 6,352,105 B1 | * | 3/2002 | Serratto | 165/221 |
| 6,488,009 B2 | * | 12/2002 | Sakurai et al. | 123/399 |
| 6,491,063 B1 | * | 12/2002 | Benatav | 137/625.43 |
| 6,684,651 B1 | * | 2/2004 | Yoshizawa et al. | 62/160 |
| 6,865,900 B2 | * | 3/2005 | Ozawa et al. | 62/199 |
| 6,926,250 B1 | * | 8/2005 | Hashimoto et al. | 251/129.11 |
| 6,932,112 B2 | * | 8/2005 | Bradford et al. | 137/625.11 |
| 7,131,460 B2 | * | 11/2006 | McLane et al. | 137/625.47 |
| 7,284,571 B2 | * | 10/2007 | Ozawa et al. | 137/352.46 |
| 7,316,384 B2 | * | 1/2008 | Sekiya et al. | 251/129.11 |

FOREIGN PATENT DOCUMENTS

| | | | |
|---|---|---|---|
| JP | 2001-65713 | * | 3/2001 |
| JP | 2001-325651 | | 11/2001 |
| JP | 2001-343077 | | 12/2001 |
| JP | 2004-037002 A | * | 2/2004 |
| JP | 2004/037002 A | * | 2/2004 |

* cited by examiner

Primary Examiner—Mohammad M Ali
(74) Attorney, Agent, or Firm—Staas & Halsey LLP

(57) ABSTRACT

A refrigerator having a valve to distribute a refrigerant to a plurality of storage compartments. The valve includes a step motor, a valve plate having at least one inlet and a plurality of outlets, and an opening/closing member rotatably coupled to the valve plate to open or close the plurality of outlets in accordance with a rotating motion thereof. In particular, the opening/closing member has one or more recesses, which are indented from the circumference of the opening/closing member by a predetermined distance, to always open only one of the plurality of outlets. With the above-described configuration, the refrigerator can reduce material costs, and can achieve not only simplified valve control, but also accurate control in temperatures of the plurality of storage compartments.

19 Claims, 8 Drawing Sheets

REFRIGERATOR

CROSS-REFERENCE TO RELATED APPLICATIONS

This application claims the benefit of Korean Patent Application No. 10-2005-0097761, filed on Oct. 17, 2005 in the Korean Intellectual Property Office, the disclosure of which is incorporated herein by reference.

BACKGROUND OF THE INVENTION

1. Field of the Invention

The present invention relates to a refrigerator, and, more particularly, to a refrigerator having a step motor valve to control the supply of a refrigerant to a plurality of storage compartments.

2. Description of the Related Art

A refrigerator is a device to maintain the freshness of various foods for a long time. For this, the refrigerator produces cold air via a refrigeration cycle, and supplies the cold air into a storage compartment thereof. Generally, the refrigerator includes a compressor, a condenser, an expansion valve, and an evaporator, so that it cools the storage compartment by use of heat transfer based on the phase variation of a refrigerant.

Some refrigerators include a plurality of storage compartments. A refrigerant cycle of these refrigerators is controlled so that foods having different storage temperatures are separately stored in the plurality of storage compartments. For the control of the refrigerant cycle, a refrigerant pipe, forming the refrigerant cycle, is provided with a refrigerant control valve to control the flow of a refrigerant.

Conventional refrigerators having a plurality of storage compartments mainly use a 3-way valve as the refrigerant control valve. For example, when a refrigerator has two storage compartments, the 3-way valve, which has a single inlet and two outlets, is able to distribute a refrigerant to the respective storage compartments. Recently, refrigerators having three or more storage compartments have been mass-produced. In this kind of refrigerators, two 3-way valves or a single 4-way valve having a single inlet and three outlets are used to control the flow of a refrigerant.

However, the use of two 3-way valves has a problem in that the two 3-way valves require a relatively large installation space, causing an increase in the overall size of the refrigerator. This also increases manufacturing costs, resulting in a high product price. Furthermore, as compared to using a single valve, using two 3-way valves requires a complicated control method due to numerous opening/closing combinations.

On the other hand, a 4-way valve suffers from a complicated interior structure thereof although it solves the above problems to some extent. Among three outlets of the 4-way valve, one outlet is adapted to be opened or closed by use of an opening/closing member, which is different from ones adapted to open or close the remaining two outlets. This has a necessity of a complicated algorithm to control the respective outlets.

Moreover, the conventional refrigerators using two 3-way valves or a single 4-way valve as stated above have a problem in that they cannot accurately control temperatures of the respective storage compartments when all outlets of the valve (s) are simultaneously opened to refrigerate the plurality of storage compartments. More specifically, even if all outlets of the valve(s) are simultaneously opened, a refrigerant cannot be equally distributed via the respective outlets for several reasons, for example, due to a difference in the resistance of refrigerant pipes extending to the respective storage compartments. Thus, the unequal amount of a refrigerant is supplied to the respective storage compartments, making it impossible for a system, which determines the supply amount of a refrigerant based on the opening time of a valve, to accurately measure the amount of the supplied refrigerant. This consequently disables accurate control in the temperature of the respective storage compartments.

SUMMARY OF THE INVENTION

The present invention has been made in order to solve the above problems. It is an aspect of the invention to provide a refrigerator which includes a simplified valve used to distribute a refrigerant to a plurality of storage compartments, thereby achieving reduced material costs and easy valve control.

It is another aspect of the invention to provide a refrigerator which is capable of accurately controlling temperatures of a plurality of storage compartments.

Consistent with one aspect, an exemplary embodiment of the present invention provides a refrigerator including a plurality of storage compartments, and a valve to supply a refrigerant to the plurality of storage compartments, wherein the valve includes: a step motor; a valve plate having at least one inlet and a plurality of outlets; and an opening/closing member rotatably coupled to the valve plate to open or close the plurality of outlets in accordance with a rotating motion thereof, and wherein the opening/closing member has one or more recesses, which are indented from the circumference of the opening/closing member by a predetermined distance, to always open only one of the plurality of outlets.

The plurality of outlets may be arranged within a rotation radius of the opening/closing member, so that the opening/closing operations of the outlets are controlled by use of the single opening/closing member.

The step motor may have a plurality of control steps to supply the refrigerant to a respective one of the plurality of storage compartments, and one of the recesses may open one of the plurality of outlets at each control step.

The one or more recesses may alternately open at least two of the plurality of outlets, so that the refrigerant is supplied to at least two of the plurality of storage compartments.

When the at least two outlets are alternately opened, part of the at least two outlets may have an opening time different from that of the remaining part.

Consistent with another aspect, an exemplary embodiment of the present invention provides a refrigerator including first to third storage compartments, and a valve to supply a refrigerant to the first to third storage compartments, wherein the valve includes: a step motor; a valve plate having at least one inlet and first to third outlets; and an opening/closing member rotatably coupled to the valve plate via a rotating shaft to open or close the first to third outlets in accordance with a rotating motion thereof, and wherein the opening/closing member has two recesses, which are indented from the circumference of the opening/closing member to the rotating shaft by a predetermined distance, and two stopples defined between the two recesses, to always open only one of the first to third outlets.

The first to third outlets may be arranged within a rotation radius of the stopples, so that the opening/closing operations of the outlets are controlled by use of the single opening/closing member.

The step motor may have first to fourth control steps to supply the refrigerant to a respective one of the first to third storage compartments, and one of the two recesses may open one of the first to third outlets at each control step.

When one of the two recesses opens one of the three outlets, the two stopples may close the other two outlets, respectively.

The two recesses may alternately open one of the outlets at each control step. In this case, one of the two recesses may open the first outlet at the first control step and the third outlet at the third control step, and the other recess may open the second outlet at the second control step and the first outlet at the fourth control step.

The step motor may perform a swing operation of the opening/closing member from the first control step to the second control step, from the second control step to the third control step, or from the third control step to the fourth control step, so that the two recesses alternately open two of the three outlets, thereby allowing the refrigerant to be supplied to two of the three storage compartments.

The step motor may perform a swing operation of the opening/closing member from the first control step to the third control step, so that the two recesses alternately open the three outlets, thereby allowing the refrigerant to be supplied to the three storage compartments. In this case, the opening/closing member may continue the second control step for half the time of the other control steps, so that the refrigerant can be evenly supplied to all the storage compartments.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE PREFERRED EMBODIMENTS

Figure 1:
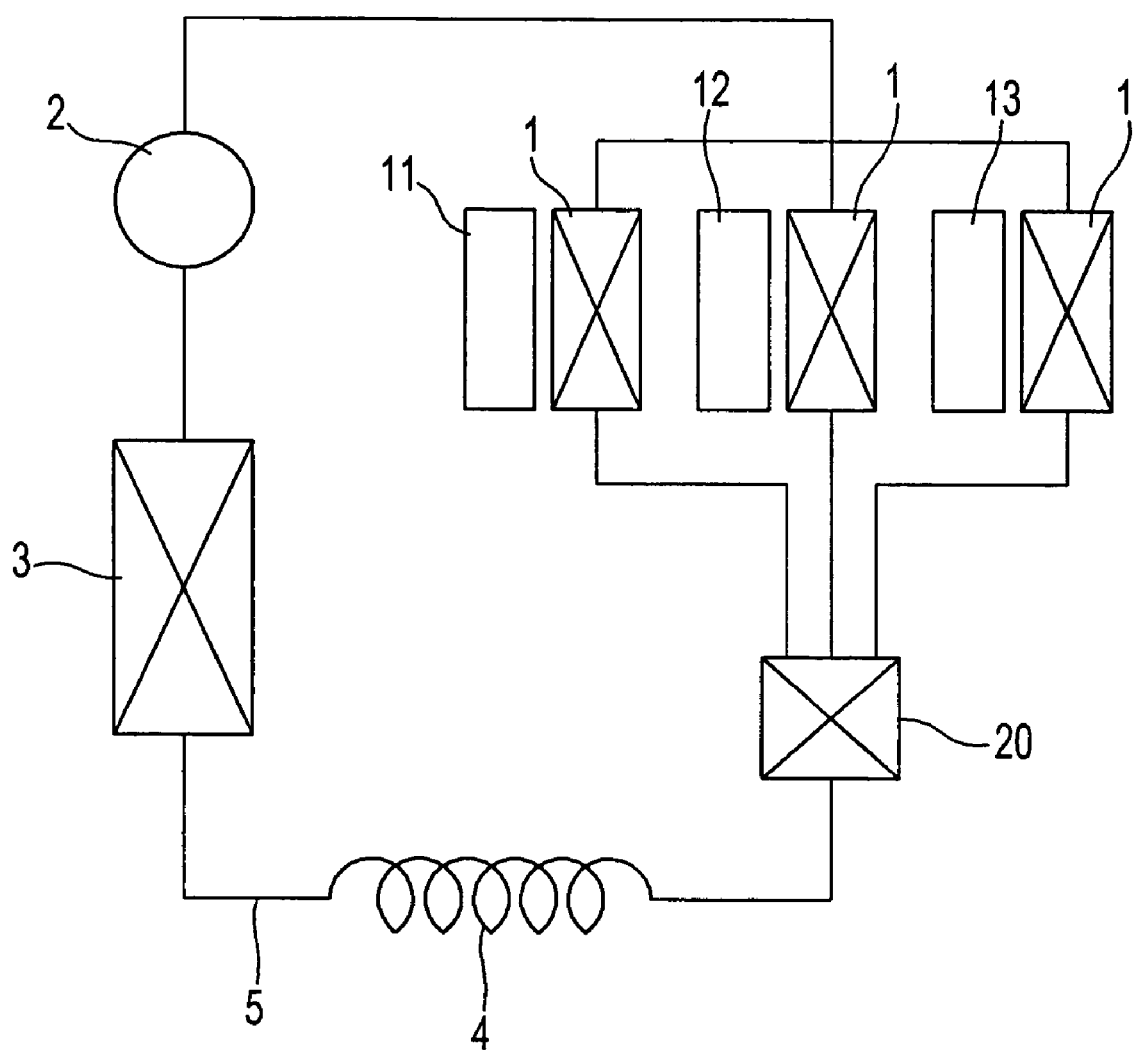
FIG. 1 is a diagram showing a refrigerator consistent with the present invention, based on a refrigeration cycle.

Reference will now be made in detail to an exemplary embodiment of the present invention, an example of which is illustrated in the accompanying drawings, wherein like reference numerals refer to like elements throughout. The embodiment is described below to explain the present invention by referring to the figures.

FIG. 1 is a diagram showing a refrigerator consistent with the present invention, based on a refrigeration cycle.

As shown in FIG. 1, the refrigerator consistent with the present invention includes three storage compartments, i.e. a first storage compartment 11, a second storage compartment 12, and a third storage compartment 13. Three evaporators 1 are arranged adjacent to the first, second, and third storage compartments 11, 12, and 13, respectively, to refrigerate the storage compartments 11, 12, and 13. Generally, in a fan cooling type refrigerator wherein cold air, produced from an evaporator, is supplied into a storage compartment by way of a fan, the evaporator is located at the rear side of the storage compartment. On the other hand, in a direct cooling type refrigerator, such as a Kimchi refrigerator, an evaporator is mounted to come into contact with an outer wall of a cabinet forming a storage compartment.

In the refrigerator consistent with the present invention, a compressor 2, a condenser 3, an expansion valve 4, and the evaporators 1 are successively interconnected via refrigerant pipes 5, to form a closed circuit. In operation, the compressor 2 compresses a gaseous refrigerant to obtain a high-temperature and high-pressure refrigerant. The compressed refrigerant is heat exchanged with the atmosphere while passing through the condenser 3, thereby being condensed into a high-pressure liquid refrigerant. As the condensed refrigerant passes through the expansion valve 4, the refrigerant is depressurized. Subsequently, the depressurized refrigerant absorbs heat of the storage compartments 11, 12, and 13 while passing through the evaporators 1, to refrigerate the storage compartments 11, 12, and 13. Finally, the low-temperature and low-pressure gaseous refrigerant, having passed through the evaporators 1, is returned to the compressor 2, completing a refrigeration cycle.

The refrigerator consistent with the present invention includes a valve 20 to control the supply of the refrigerant to the first to third storage compartments 11 to 13. The valve 20 is a 4-way step valve having a single inlet and three outlets. In particular, the valve 20 is opened in such a fashion that only one of the three outlets is opened.

Figure 2:
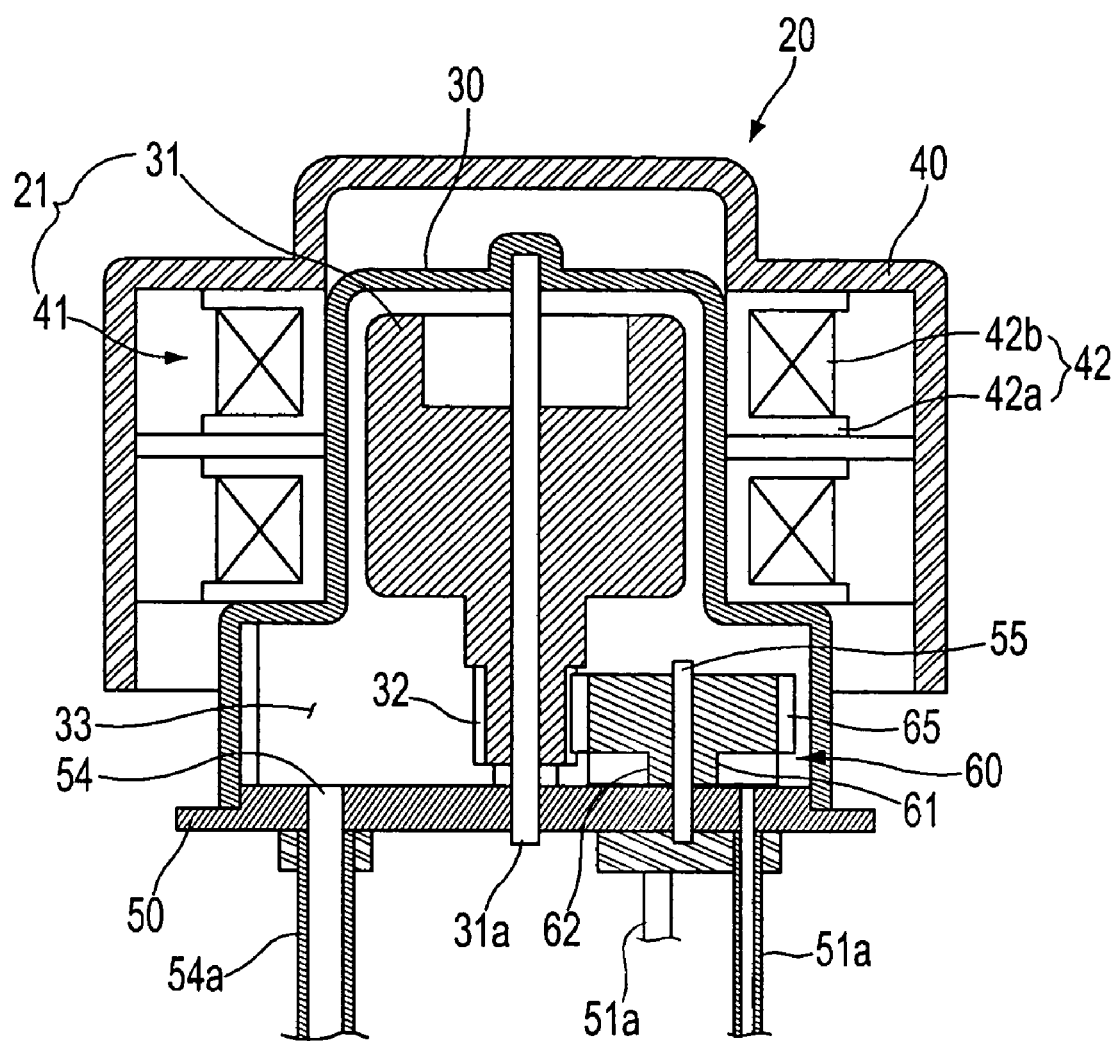
FIG. 2 is a sectional view showing the configuration of a valve employed in the refrigerator consistent with the present invention.
Figure 3:
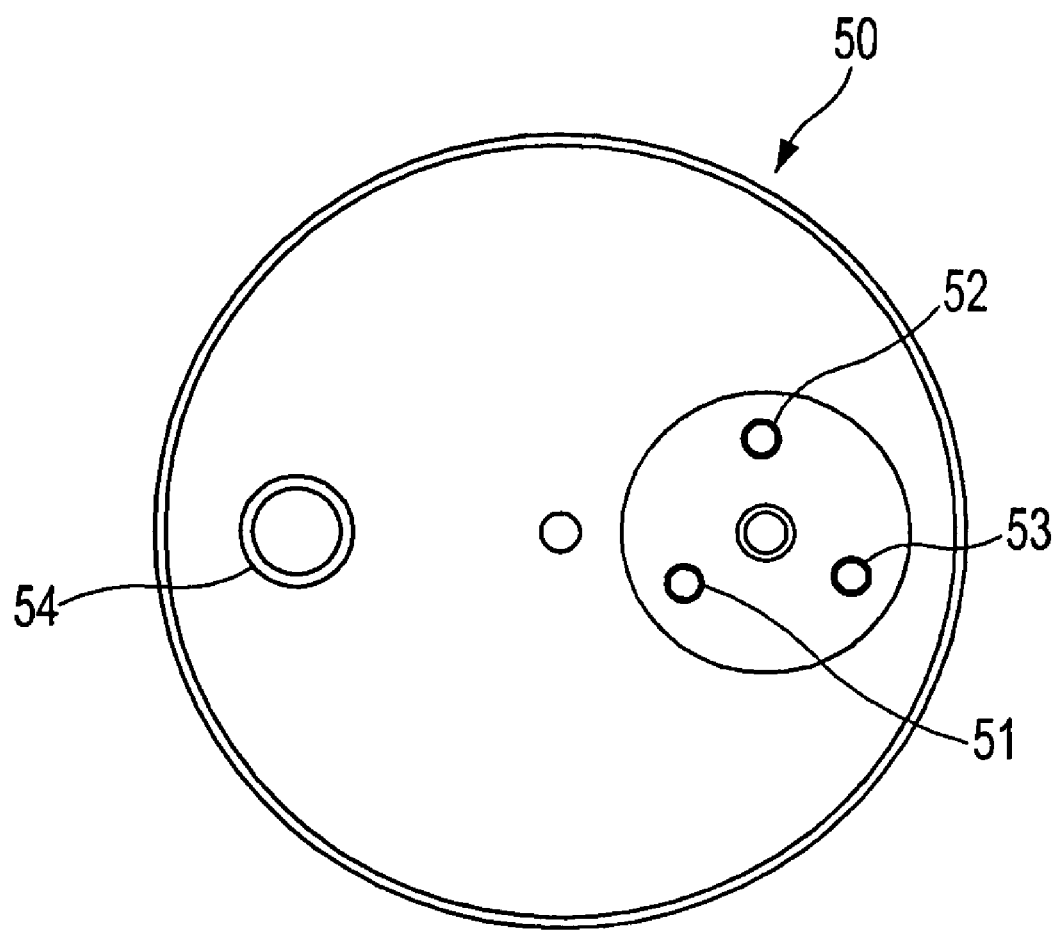
FIG. 3 is a plan view showing a valve plate included in the valve of FIG. 2.
Figure 4:
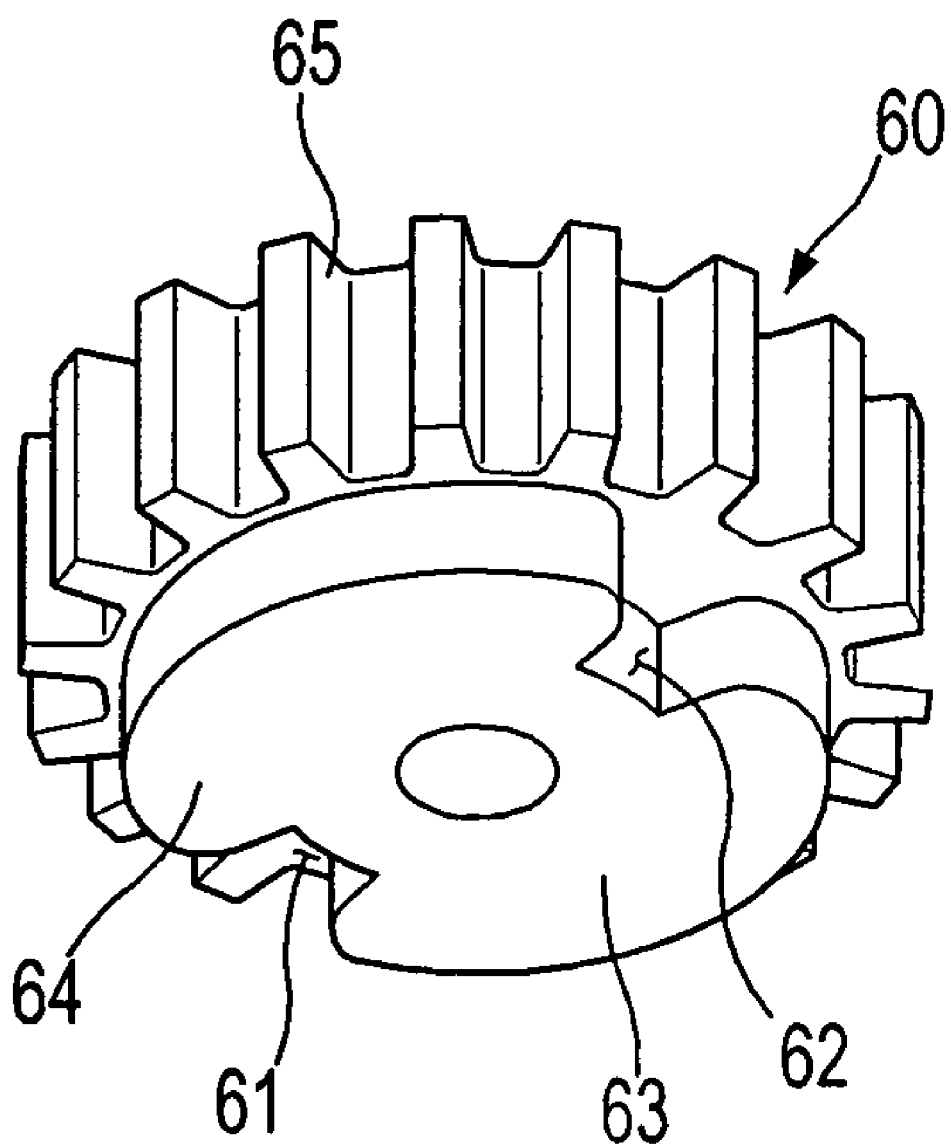
FIG. 4 is a perspective view showing an opening/closing member included in the valve of FIG. 2.

FIG. 2 is a sectional view showing the configuration of the valve 20 employed in the refrigerator consistent with the present invention. FIG. 3 is a plan view showing a valve plate included in the valve 20 of FIG. 2. FIG. 4 is a perspective view showing an opening/closing member included in the valve 20 of FIG. 2. As shown in FIGS. 2 to 4, the valve 20 includes a valve body 30, an outer case 40 to enclose the valve body 30, and a valve plate 50 coupled to a lower end of the valve body 30.

The refrigerator consistent with the present invention employs a step motor 21 including a cylindrical rotor 31 and an annular stator 41. The rotor 31 is rotatably fitted on a rotor shaft 31a to be arranged in the valve body 30. The stator 41 is coupled around the rotor 31 to be arranged in the outer case 40. The stator 41 of the step motor 21 has a coil unit 42 consisting of an iron core 42a and a lead wire 42b wound on the iron core 42a. The coil unit 42 is able to accurately control a rotating motion of the rotor 31 upon receiving a pulse current transmitted from a control circuit (not shown). A pinion 32 is formed at a lower end of the rotor 31. The pinion 32 serves to transmit a power to an opening/closing member 60 while simultaneously rotating with the rotor 31.

The valve plate 50 has a single inlet 54 formed at a lateral location thereof to introduce the refrigerant into the valve body 30, and three outlets 51, 52, and 53 to discharge the introduced refrigerant to the outside of the valve body 30 by way of different paths from one another. The three outlets 51, 52, and 53 are equidistantly arranged to form a concentric circle about a valve rotating shaft 55. The opening/closing member 60 is fitted on the valve rotating shaft 55 to open or close the outlets 51, 52, and 53. The reason why the three outlets 51, 52, and 53 are arranged on the concentric circle about the valve rotating shaft 55 is to control the opening/closing operations of all the outlets 51, 52, and 53 by use of the single opening/closing member 60. Hereinafter, for the sake of convenience of explanation, a leftmost outlet, which is closest to the inlet 54, is called as the first outlet 51, and the second and third outlets 52 and 53 are followed in clockwise order. An introduction pipe 54a is inserted into the inlet 54 to supply the refrigerant into the valve body 30, and three discharge pipes 51a are inserted into the three outlets 51, 52, and 53, respectively, to supply the refrigerant to the respective storage compartments 11, 12, and 13.

The valve body 30 internally defines a refrigerant path 33 between the lower end of the rotor 31 and the valve plate 50. One side of the refrigerant path 33 is connected with the inlet 54, and the other side is connected with the three outlets 51, 52, and 53. The valve rotating shaft 55 is located at the other side of the refrigerant path 33 connected with the outlets 51, 52, and 53 so that the opening/closing member 60 is rotatably coupled to the valve plate 55 via the valve rotating shaft 55. Thereby, the opening/closing member 60 is able to open or close the outlets 51, 52, and 53 as it is simultaneously rotated along with the valve rotating shaft 55.

The opening/closing member 60 of the present invention, in particular, has two recesses 61 and 62 formed at a lower surface thereof. The two recesses 61 and 62 are indented from opposite locations at the circumference of the opening/closing member 60 to the center of the opening/closing member 60, i.e. to the valve rotating shaft 55, by a predetermined distance. With the use of the two recesses 61 and 62, the opening/closing member 60 is able to always open only one of the three outlets 51, 52, and 53 of the valve plate 50. The two recesses 61 and 62 define two stopples 63 and 64 therebetween. The two stopples 63 and 64 serve to close two outlets, respectively, when one of the recesses opens any one of the outlets.

A gear 65 is integrally formed at the circumference of the opening/closing member 60. The gear 65 is engaged with the pinion 32, which is rotated by the rotor 31. Thus, the opening/closing member 60 is rotated in accordance with rotation of the rotor 31, to open one of the outlets at a predetermined control step. Thereby, the refrigerant can be supplied to a respective one of the storage compartments via the open outlet.

Figure 5:
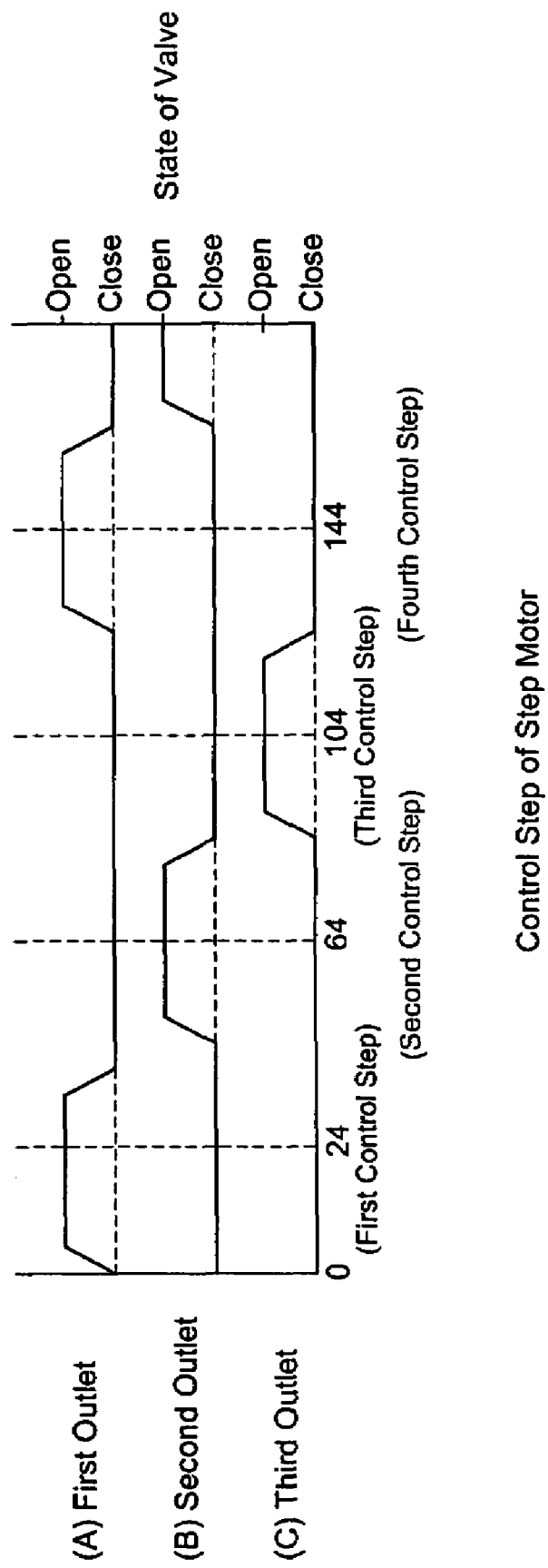
FIG. 5 is a view showing control steps of a step motor employed in the refrigerator consistent with the present invention.
Figure 6:
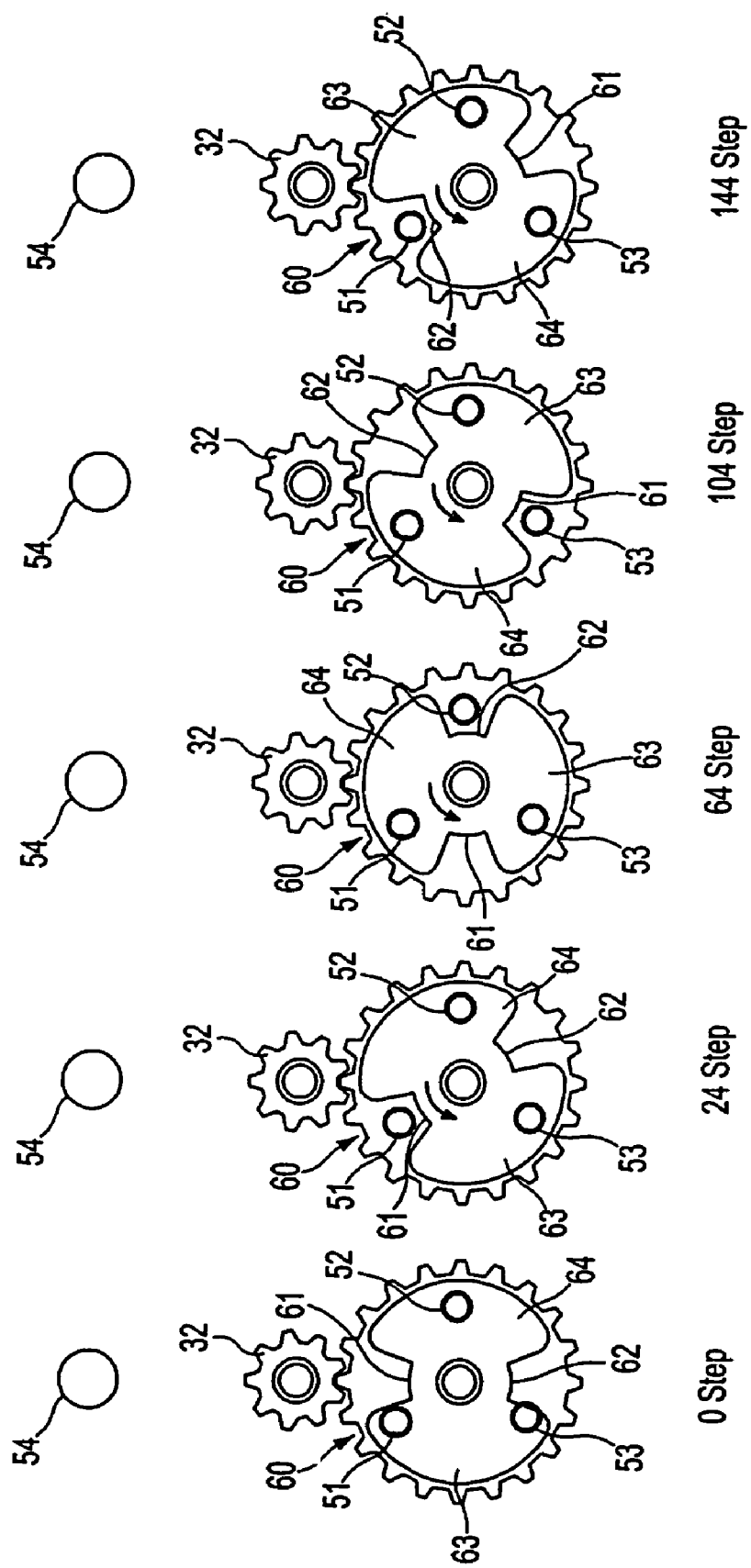
FIG. 6 is a view explaining the operation of the opening/closing member at respective control steps of the refrigerator consistent with the present invention.

Hereinafter, the operation of the refrigerator consistent with the present invention will be explained. FIG. 5 is a view showing control steps of the step motor 21 employed in the refrigerator consistent with the present invention. FIG. 6 is a view explaining the operation of the opening/closing member 60 at respective control steps of the refrigerator consistent with the present invention.

As shown in FIGS. 5 and 6, all the outlets 51, 52, and 53 are closed by the opening/closing member 60 in an initial state (0 step). If a pulse current is applied to the coil unit 42 of the step motor 21 in the initial state, the rotor 31 rotates clockwise about the rotor shaft 31a. Such a clockwise rotation of the rotor 31 is transmitted to the opening/closing member 60 via the pinion 32 and the gear 65, causing the opening/closing member 60 to be rotated counterclockwise. Hereinafter, for the sake of convenience of explanation, one of the recesses of the opening/closing member 60, which is located close to the first outlet 51 in the initial state, is called as the first recess 61, and one of the stopples, which closes the first outlet 51 in the initial state, is called as the first stopple 63. The remaining recess and stopple are the second recess 62 and the second stopple 64.

The step motor 21 consistent with the present invention controls the opening/closing member 60 via four control steps including a first control step (24 step), a second control step (64 step), a third control step (104 step), and a fourth control step (144 step). If the opening/closing member 60 is rotated by a predetermined angle at the first control step, the first recess 61 of the opening/closing member 60 opens only the first outlet 51. In this case, the second and third outlets 52 and 53 are closed by the second stopple 64 and the first stopple 63, respectively. Accordingly, the refrigerant, which has been introduced into the valve body 30 via the inlet 54, is supplied only to the first storage compartment 11 via the first outlet 51. Similarly, if the opening/closing member 60 is further rotated at the second control step, the second recess 62 opens only the second outlet 52. In this case, the first and third outlets 51 and 53 are closed by the second stopple 64 and the first stopple 63, respectively. Accordingly, the refrigerant is supplied only to the second storage compartment 12. At the third control step, the first recess 61 opens the third outlet 53, and the first and second outlets 51 and 52 are closed by the second and first stopples 64 and 63, respectively. Accordingly, the refrigerant is supplied only to the third storage compartment 13. Finally, at the fourth control step, the first outlet 51 is again opened by the second recess 62. The reason why the first outlet 51 is again opened at the fourth control step will be explained hereinafter.

Figure 7:
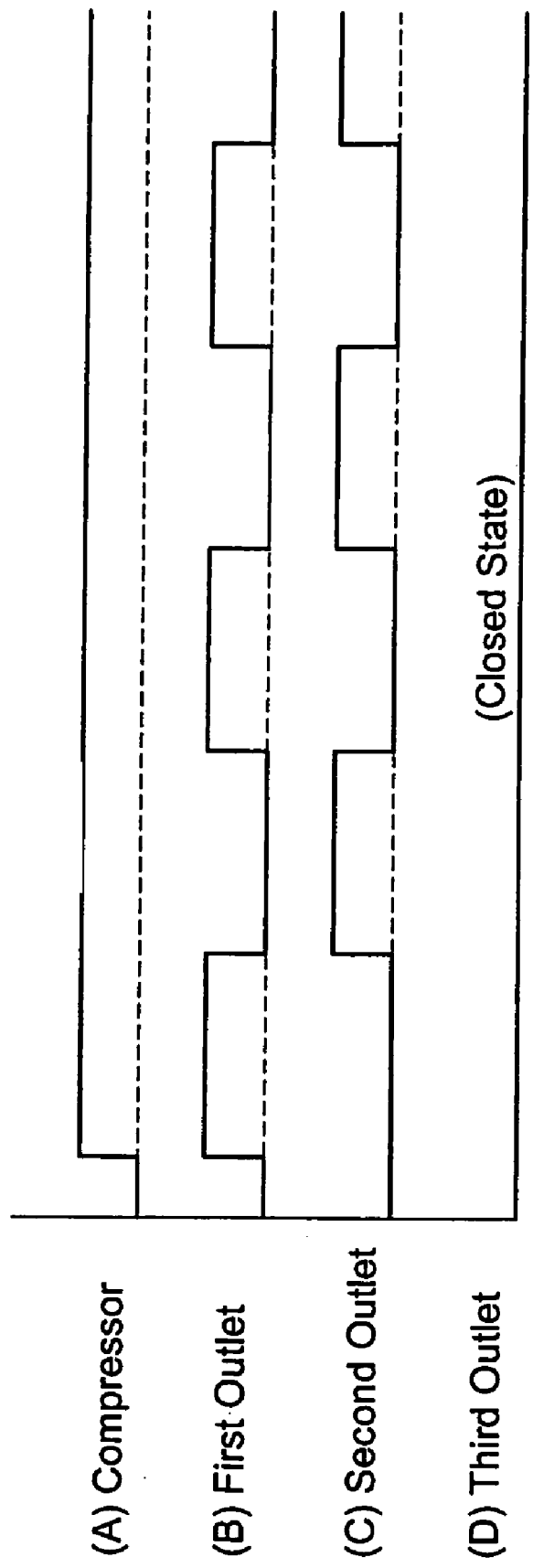
FIG. 7 is a view explaining the supply of a refrigerant to first and second storage compartments of the refrigerator consistent with the present invention.

FIG. 7 is a view explaining the supply of the refrigerant to the first and second storage compartments 11 and 12 of the refrigerator consistent with the present invention. As shown in FIG. 7, the step motor 21 performs a swing operation of the opening/closing member 60 from the first control step to the second control step so that the two recesses 61 and 62 alternately open the first outlet 51 and the second outlet 52, to supply the refrigerant to both the first and second storage compartments 11 and 12. Thereby, both the storage compartments 11 and 12 can be cooled even for opening only one outlet at one control step. In this case, the third outlet 53 is continuously closed by the first stopple 63, and thus, no refrigerant is supplied to the third storage compartment 13. FIG. 7 explains an example for supplying the refrigerant to two of the three storage compartments. As will be easily expected, if the step motor 21 performs a swing operation of the opening/closing member 60 from the second control step to the third control step, the refrigerant is supplied to the second and third storage compartments 12 and 13.

Meanwhile, if the step motor 21 performs a swing operation of the opening/closing member 60 from the first control step to the third control step to supply the refrigerant to the first and third storage compartments 11 and 13, the second outlet 52 is inevitably opened at the second control step between the first and third control steps. To prevent the unintentional opening of the second outlet 52, the step motor 21 may perform a swing operation of the opening/closing member 60 from the fourth control step to the third control step when it is desired to supply the refrigerant to the first and third storage compartments 11 and 13.

Figure 8:
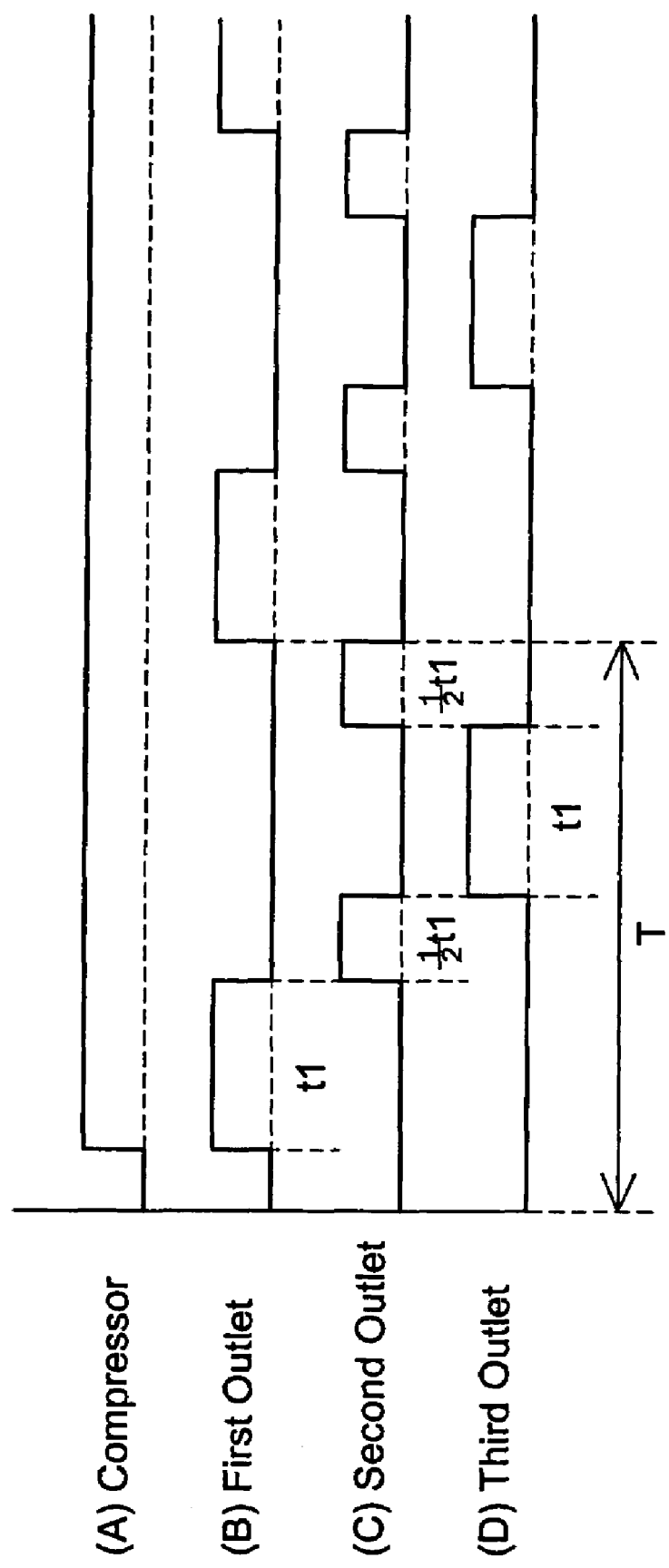
FIG. 8 is a view explaining the supply of a refrigerant to first to third storage compartments of the refrigerator consistent with the present invention.

FIG. 8 is a view explaining the supply of the refrigerant to all the first to third storage compartments of the refrigerator consistent with the present invention. As shown in FIG. 8, the step motor 21 performs a swing operation of the opening/closing member 60 from the first control step to the third control step, so that the two recesses 61 and 62 alternately open the first outlet 51, second outlet 52, and third outlet 53, thereby allowing the refrigerant to be supplied to the first to third storage compartments 11 to 13. That is, if the step motor 21 performs the swing operation in the sequence of the first control step, the second control step, the third control step, the second control step, and the first control step, the two recesses 61 and 62 of the opening/closing member 60 alternately open the first outlet 51, the second outlet 52, the third outlet 53, the second outlet 52, and the first outlet 51 in this sequence, enabling cooling of all the three storage compartments 11, 12, and 13.

In association with the above-described swing operation, it should be noted that the first and third outlets 51 and 53 are opened once for opening period t1, respectively, for a period T of each control step, but the second outlet 52 is opened twice for opening period ½ t1. Thus, to supply an equal amount of the refrigerant to the respective storage compartments, every opening time of the second outlet 52 must be half the time of the first or third outlet 51 or 53.

The technical ideal of the present invention is not limited to a 4-way valve, and is applicable to valves having four or more outlets in accordance with the number of storage compartments defined in a refrigerator, based on the same principle.

As apparent from the above description, the present invention provides a refrigerator having a simplified valve used to distribute a refrigerant to a plurality of storage compartments thereof, thereby achieving reduced material costs and easy valve control.

Furthermore, according to the present invention, the refrigerant is supplied via only one of a plurality of outlets. This has the effect of enabling accurate control in temperatures of the respective storage compartments.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A refrigerator comprising a plurality of storage compartments, and a valve to supply a refrigerant to the plurality of storage compartments,
    wherein the valve includes:
        a step motor;
        a valve plate having at least one inlet and a plurality of outlets; and
        an opening/closing member rotatably coupled to the valve plate to open or close the plurality of outlets in accordance with a rotating motion thereof, and
        wherein the opening/closing member has one or more recesses, which are indented from the circumference of the opening/closing member by a predetermined distance, to open only one of the plurality of outlets at a time.

2. The refrigerator according to claim 1, wherein the plurality of outlets is arranged within a rotation radius of the opening/closing member, so that the opening/closing operations of the outlets are controlled by use of the single opening/closing member.

3. The refrigerator according to claim 1, wherein the step motor has a plurality of control steps to supply the refrigerant to a respective one of the plurality of storage compartments, and
    one of the recesses opens one of the plurality of outlets at each control step.

4. The refrigerator according to claim 3, wherein the one or more recesses alternately open at least one of the plurality of outlets, so that the refrigerant is supplied to at least one of the plurality of storage compartments.

5. The refrigerator according to claim 4, wherein, when the at least one outlet is alternately opened, part of the at least one outlet has an opening time different from that of the remaining part.

6. A refrigerator comprising first to third storage compartments, and a valve to supply a refrigerant to the first to third storage compartments,
    wherein the valve includes:
        a step motor;
        a valve plate having at least one inlet and first to third outlets; and
        an opening/closing member rotatably coupled to the valve plate via a rotating shaft to open or close the first to third outlets in accordance with a rotating motion thereof, and
        wherein the opening/closing member has two recesses, which are indented from the circumference of the opening/closing member to the rotating shaft by a predetermined distance, and two stopples defined between the two recesses, to open only one of the first to third outlets at a time.

7. The refrigerator according to claim 6, wherein the first to third outlets are arranged within a rotation radius of the stopples, so that the opening/closing operations of the outlets are controlled by use of the single opening/closing member.

8. The refrigerator according to claim 6,
    wherein the step motor has first to fourth control steps to supply the refrigerant to a respective one of the first to third storage compartments, and
    one of the two recesses opens one of the first to third outlets at each control step.

9. The refrigerator according to claim 8, wherein when one of the two recesses opens one of the three outlets, the two stopples close the other two outlets, respectively.

10. A refrigerator comprising at least two storage compartments, and a valve to supply a refrigerant to the compartments,
    wherein the valve includes:
        a step motor;
        a valve plate having at least one inlet and at least two outlets; and
        an opening/closing member rotatably coupled to the valve plate via a rotating shaft to open or close the plurality of outlets in accordance with a rotating motion thereof,
        wherein the opening/closing member has at least two recesses, which are indented from the circumference of the opening/closing member to the rotating shaft by a predetermined distance, and
        the recesses alternately open one of the outlets at each control step.

11. The refrigerator according to claim 8, wherein one of the two recesses opens the first outlet at the first control step and the third outlet at the third control step, and the other recess opens the second outlet at the second control step and the first outlet at the fourth control step.

12. The refrigerator according to claim 11, wherein the step motor performs a swing operation of the opening/closing member from the first control step to the second control step, from the second control step to the third control step, or from the third control step to the fourth control step, so that the two recesses alternately open one of the three outlets, thereby allowing the refrigerant to be supplied to the storage compartment corresponding to the open outlet.

13. The refrigerator according to claim 11, wherein the step motor performs a swing operation of the opening/closing member from the first control step to the third control step, so that the two recesses alternately open one of the three outlets, thereby allowing the refrigerant to be supplied to the storage compartment corresponding to the open outlet.

14. The refrigerator according to claim 13, wherein the opening/closing member continues the second control step for half the time of the other control steps.

15. A valve to supply refrigerant to a plurality refrigerator storage compartments, comprising:
   a motor;
   a valve plate having an inlet and a plurality of outlets, a number of outlets corresponding to a number of storage compartments; and
   an opening/closing member rotatably coupled to the valve plate to open or close the plurality of outlets in accordance with a rotating motion thereof, and
   wherein the opening/closing member has one or more recesses, which are indented from the circumference of the opening/closing member by a predetermined distance, to open only one of the plurality of outlets at a time.

16. The valve of claim 15, wherein the plurality of outlets is arranged within a rotation radius of the opening/closing member, so that the opening/closing operations of the outlets are controlled by use of the single opening/closing member.

17. The valve of claim 15, wherein the motor is a step motor having a plurality of control steps, and
   one of the recesses opens one of the plurality of outlets at each control step.

18. The valve of claim 17, wherein the one or more recesses alternately open at least one of the plurality of outlets, so that the refrigerant is supplied to at least one of the plurality of storage compartments.

19. The valve of claim 18, wherein when the at least one outlet is alternately opened, part of the at least one outlets has an opening time different from that of the remaining part.

* * * * *

UNITED STATES PATENT AND TRADEMARK OFFICE
CERTIFICATE OF CORRECTION

PATENT NO. : 7,437,888 B2
APPLICATION NO. : 11/357968
DATED : October 21, 2008
INVENTOR(S) : Seok Jun Son et al.

It is certified that error appears in the above-identified patent and that said Letters Patent is hereby corrected as shown below:

Column 10, Line 17, after "part of the at least one" change "outlets" to --outlet--.

Signed and Sealed this

Thirteenth Day of January, 2009

JON W. DUDAS
*Director of the United States Patent and Trademark Office*